United States Patent Office 3,442,639
Patented May 6, 1969

3,442,639
PROCESS OF SELECTIVELY ELIMINATING WEEDS
Quentin F. Soper, Indianapolis, Ind., assignor to Eli Lilly and Company, Indianapolis, Ind., a corporation of Indiana
No Drawing. Filed Dec. 22, 1965, Ser. No. 515,760
The portion of the term of the patent subsequent to June 21, 1983, has been disclaimed
Int. Cl. A01n 9/20; C07c 87/52
U.S. Cl. 71—121      5 Claims

ABSTRACT OF THE DISCLOSURE

This invention relates to a group of novel 2,4-dinitroanilines useful as selective herbicides.

The novel 2,4-dinitroanilines are of the following formula:

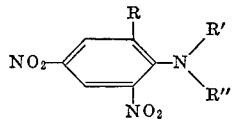

wherein R is trifluoromethyl, or halo having a molecular weight less than 81; R' is hydrogen, $C_2$–$C_4$ alkyl, allyl, chloroallyl, crotyl, or methallyl; and R" is $C_1$–$C_7$ alkyl, allyl, chloroallyl, crotyl, or methallyl, the sum of the carbon atoms in R' and R" being greater than 3 and less than 9.

---

Compounds provided by this invention are represented by the following formula:

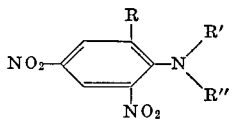

wherein R is trifluoromethyl or halo having a molecular weight less than 81; i.e., chloro, bromo, or fluoro; R' is hydrogen, $C_2$–$C_4$ alkyl, allyl, crotyl, chloroallyl, or methallyl; and R" is $C_1$–$C_7$ alkyl, allyl, crotyl, chloroallyl, or methallyl, the sum of the carbon atoms in R' and R" being greater than 3 and less than 9. Groups illustrative of R' when it is $C_2$–$C_4$ alkyl, include ethyl, n-propyl, isopropyl, n-butyl, sec-butyl and iso-butyl. Groups illustrative of R" when it represents $C_1$–$C_7$ alkyl include, in addition to the above $C_2$–$C_4$ alkyl groups, methyl, 3,3-dimethyl-2-pentyl, 4-methylpentyl, 3-ethyl-2-pentyl, 2-pentyl, 2-hexyl, 3-pentyl, 4-heptyl and the like.

Compounds coming within the scope of this invention thus include the following:

N,N-diethyl-2,4-dinitro-6-fluoroaniline
N-ethyl-N-n-butyl-2,4-dinitro-6-trifluoromethylaniline
N-(4-heptyl)-2,4-dinitro-6-chloroaniline
N,N-di-isopropyl-2,4-dinitro-6-chloroaniline
N,N-dimethallyl-2,4-dinitro-6-fluoroaniline
N-allyl-N-(2-pentyl)-2,4-dinitro-6-bromoaniline
N-chloroallyl-N-n-pentyl-2,4-dinitro-6-trifluoromethylaniline
N,N-dicrotyl-2,4-dinitro-6-chloroaniline
N-sec-butyl-2,4-dinitro-6-fluoroaniline
N,N-di-sec-butyl-2,4-dinitro-6-trifluoromethylaniline
N-ethyl-N-n-hexyl-2,4-dinitro-6-bromoaniline
N-(3-heptyl)-2,4-dinitro-6-trifluoromethylaniline
N-(3-pentyl)-2,4-dinitro-6-chloroaniline
N-allyl-N-methyl-2,4-dinitro-6-bromoaniline The compounds provided by this invention are, in general, low-melting solids, a number of them melting below ordinary room temperature. They are prepared by the reaction of a 2,4-dinitro-6-substituted-chlorobenzene and an amine, said amine being represented by the formula:

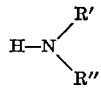

wherein R' and R" have the same meaning as hereinabove. The aniline products are isolated from the reaction mixture by standard procedures and are purified either by recrystallization or by chromatography.

Compounds represented by the above formula are selective pre-emergent herbicides; that is to say, they have the ability to kill germinating and seedling weed grasses and certain broadleaf plants in the germinating or seedling stages of growth without affecting the growth of either germinating, seedling or established crop plants such as corn, cotton, soybeans and the like. In view of this selectivity, the compounds can be applied to a crop-growing area either prior to, at the same time as, or after the time of planting the crop. This flexibility of application is a decided advantage of my novel herbicides. If the herbicide is to be used prior to, or at the same time as, the planting of the crop, it can be applied to the entire crop area, either on the soil surface or incorporated into the upper layer of soil, the latter being preferable. If it is applied to an area infested with weed seeds after the crop plant has become established, it is customarily applied between rows either by spraying on the soil surface or by soil incorporation. Crop areas other than those mentioned above to which the above compounds can be applied as pre-emergent herbicides include tomato fields, strawberry patches and, in addition, areas growing the following crop plants: collards, great northern beans, kidney beans, navy beans, cowpeas, safflower, peppers, peanuts, snapbeans, cauliflower, watermelon, brussel sprouts, cabbage, kale, asparagus, vetch, chard, white potatoes, lettuce, beets, carrots, rutabaga, lima beans, green peas, alfalfa, lespedeza, cucumbers, muskmelons, parsnips, okra, broccoli, sunflowers, pumpkins, radishes, sweet potatoes, peppermint, flax as well as crops related to these. With certain crops such as tobacco, the particular herbicidal compound is most favorably employed at the time of transplanting, using either surface application or soil incorporation.

In addition to their use in crop areas, the compounds of this invention can also be used to treat other areas where established plants are present such as bluegrass lawns, apple orchards, orange groves, and the like.

The ability of the compounds of this invention to selectively eliminate germinating and seedling weed grasses and germinating and seedling broadleaf weeds from crop-growing areas is well illustrated with reference to N,N-di-n-propyl-2,4-dinitro-6-trifluoromethylaniline, a compound coming within the scope of the above formula. This compound, at application rates as high as 8 pounds per acre, causes no damage to germinating, seedling or established corn, cotton, and soybeans. On the other hand, at application rates anywhere from 8 pounds per acre down to 1 pound per acre, the compound shows excellent ability to eliminate germinating and seedling grasses such as crabgrass and foxtail, and broadleaf weeds such as pigweed from a crop-growing area infested with weed seeds. Other broadleaf weeds or weed grasses which can be eliminated in the seedling or germinating stage of growth from a crop-growing, or similar, area infested with seeds of such weeds by application thereto of a compound coming within the scope of the above formula, include other members of the genus Amaranthus, in addition to pigweed, the genus Polygonum, including smartweed, the genus Chenopodium, particularly lambs-quarter, the genus Stellaria, including chickweed, weeds belonging to the following genera: Mollugo, Salsola, Kochia, Galinsoga, and Portulaca, and grass weeds such as Johnson grass, goose grass, sandbur, witch grass and the like.

In actual use, a compound represented by the above formula is best applied to a crop-growing area prior to, or at the same time as, planting of the crop by incorporation into the upper layer of soil by means of a rotary hoe or similar device. The application rate can vary from 1-8 pounds per acre, or even higher with certain crops, without damage to the crop. For application to these and other areas, the compounds can be formulated in either liquid or solid form. A typical solid formulation is one containing the following ingredients:

| | Percent |
|---|---|
| N,N - di - n - propyl - 2,4 - dinitro - 6 - trifluoromethylaniline | 2 |
| Aromatic naphtha solvent | 3 |
| Vermiculite | 95 |

The solution of the herbicide is dispersed on the vermiculite according to standard procedures.

A useful liquid concentrate is one containing

| | Percent |
|---|---|
| N,N - di - n - propyl - 2,4 - dinitro - 6 - trifluoromethylaniline | 35 |
| Emulsifier | 5 |
| Xylene | 60 |

The emulsifier typically might contain three parts of the calcium salt of myristylbenzene sulfonic acid to one part of the oleate ester of a polyoxyethylene glycol, molecular weight=350 or thereabouts.

The preparation of the compounds of this invention is further illustrated by the following specific examples:

EXAMPLE I

N,N-diethyl-2,4-dinitro-6-trifluoromethylaniline

Five grams of 2,4-dinitro-6-trifluoromethylchlorobenzene were dissolved in 100 ml. of benzene. Twenty milliliters of diethylamine were added to the solution with stirring. After the addition had been completed, the mixture was heated to reflux temperature for about 3 hours. A precipitate of diethylamine hydrochloride, formed as a by-product in the reaction, was separated by filtration. Evaporation of the filtrate to dryness in vacuo yielded a liquid residue which solidified upon standing. Recrystallization of the residue from hexane yielded N,N-diethyl-2,4-dinitro-6-trifluoromethylaniline, melting at about 60–61° C.

*Analysis.*—Calcd.: N, 13.68. Found: N, 13.43.

The solid products listed in Table I were prepared according to the above procedure by reaction of the appropriate amine with a 2,4-dinitro-6-substituted-chlorobenzene and were recrystallized from hexane. Table I lists the name of the aniline compound, its melting point, theoretical percent nitrogen, and percent nitrogen found by analysis.

TABLE I

| Compound name | Melting point, °C. | Percent nitrogen Theoretical | Found |
|---|---|---|---|
| N,N-diallyl-2,4-dinitro-6-trifluoromethylaniline | 54–56 | 12.69 | 12.07 |
| N-ethyl-N-n-propyl-2,4-dinitro-6-trifluoromethylaniline | 51–52 | 13.08 | 13.04 |
| N,N-di-n-propyl-2,4-dinitro-6-trifluoromethylaniline | 67–70 | 12.53 | 12.56 |
| N-methyl-N-n-propyl-2,4-dinitro-6-trifluoromethylaniline | 45.5–47 | 13.68 | 14.13 |
| N,N-di-n-butyl-2,4-dinitro-6-trifluoromethylaniline | 33–37 | 11.57 | 11.76 |
| N-n-butyl-N-n-propyl-2,4-dinitro-6-trifluoromethylaniline | 33–34 | 12.03 | 11.77 |
| N,N-diethyl-2,4-dinitro-6-trifluoromethylaniline | 60–61 | 13.68 | 13.43 |
| N,N-di-n-propyl-2,4-dinitro-6-chloroaniline | 49–51 | 13.93 | 13.89 |

In addition, the following compounds were prepared by the same procedure but melted below room temperature. Table II lists these compounds giving the name of the compound in Column 1 and its percent nitrogen, theoretical and found, in Column 2.

TABLE II

| Compound name | Percent nitrogen Theoretical | Found |
|---|---|---|
| N-(3-pentyl)-2,4-dinitro-6-trifluoromethylaniline | 13.08 | 12.90 |
| N-(4-heptyl)-2,4-dinitro-6-trifluoromethylaniline | 12.03 | 12.10 |
| N-(sec-butyl)-N-methyl-2,4-dinitro-6-trifluoromethylaniline | 13.08 | 13.05 |
| N-(2-pentyl)-2,4-dinitro-6-trifluoromethylaniline | 13.08 | 12.88 |
| N-(2-hexyl)-2,4-dinitro-6-trifluoromethylaniline | 12.53 | 12.76 |
| N-sec-butyl-2,4-dinitro-6-trifluoromethylaniline | 13.68 | 13.76 |

The starting materials useful in the above examples can be prepared in a variety of ways. One particularly convenient procedure involves the nitration of a 2-substituted-4-nitrochlorobenzene wherein the substituents are halo, trifluoromethyl or methylsulfonyl. The following preparation illustrates this procedure:

Preparation I

One hundred and fifty grams of 2-trifluoromethyl-4-nitro-chlorobenzene were dissolved in 300 ml. of 30 percent fuming sulfuric acid. The resulting solution was added slowly with stirring to a mixture composed of 300 ml. of 30 percent fuming sulfuric acid, 600 g. of 18 M sulfuric acid, and 450 g. of nitric acid (90 percent; Sp. Gr.=1.5). The mixture was slowly heated to about 100° C. and was maintained at this temperature for about 3 hours. It was next heated to about 105° C. for about 2 hours and was then allowed to cool to about 50° C. The cooled reaction mixture was poured over 2,000 g. of ice. A precipitate resulted, comprising 2,4-dinitro-6-trifluoromethylchlorobenzene, which was separated by filtration. The filter cake was washed several times with water. Recrystallization of the isolated solid product yielded purified 2,4 - dinitro-6-trifluoromethylchlorobenzene, melting at about 56–57° C.

Alternatively, a 2,4-dinitro-6-substituted-phenol, bearing one of the same substituents in the 6 position as above, can be treated with a chlorinating agent to prepare the corresponding chlorobenzene derivative. The following preparation illustrates this procedure:

Preparation II

A mixture of 44 g. of 6-chloro-2,4-dinitrophenol prepared by the nitration of o-chlorophenol, 40 g. of p-toluene sulfonylchloride, and 60 g. of diethylamine was heated at about 80° C. with stirring for about 4 hours. The reaction mixture was poured into 200 ml. of 10 percent aqueous hydrochloric acid, and the resulting mixture stirred and cooled until a solid product appeared. The solid was separated by filtration, and the filter cake was washed with 100-ml. portions of 10 percent sodium acetate until the washes became colorless. Recrystallization of the filtered product from ethanol gave 1,2-dichloro-3,5-dinitrobenzene melting at about 55–57° C.

I claim:

1. The process of selectively eliminating germinating and seedling weed grasses and germinating and seedling broadleaf weeds from an area infested therewith, without affecting the growth of germinating, seedling, and established crop plants present in the same area, which comprises applying to said area from 1–8 pounds per acre of an active agent which is a compound of the formula

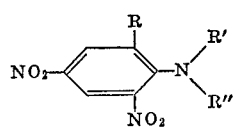

wherein R is trifluoromethyl, or halo having a molecular weight less than 81; R' is hydrogen, $C_2$–$C_4$ alkyl, allyl, chloroallyl, crotyl, or methallyl; and R'' is $C_1$–$C_7$ alkyl, allyl, chloroallyl, crotyl, or methallyl, the sum of the carbon atoms in R' and R'' being greater than 3 and less than 9.

2. The process of claim 1 wherein the active agent is N,N-di-n-propyl-2,4-dinitro-6-chloroaniline.

3. The process of claim 1 wherein the active agent is N-ethyl-N-n-propyl-2,4-dinitro-6-trifluoromethylaniline.

4. The process of claim 1 wherein the active agent is N,N-diethyl-2,4-dinitro-6-trifluoromethylaniline.

5. The process of claim 1 wherein the active agent is N,N-di-n-propyl-2,4-dinitro-6-trifluoromethylaniline.

References Cited

UNITED STATES PATENTS

| | | | |
|---|---|---|---|
| 3,119,736 | 1/1964 | Clark et al. | 167—30 |
| 3,257,190 | 6/1966 | Soper | 71—2.3 |

JAMES O. THOMAS, JR., *Primary Examiner.*

U.S. Cl. X.R.

260—577